(Model.)
H. H. SPENCER.
Stalk and Weed Roller and Cutter.
No. 240,473.                    Patented April 19, 1881.
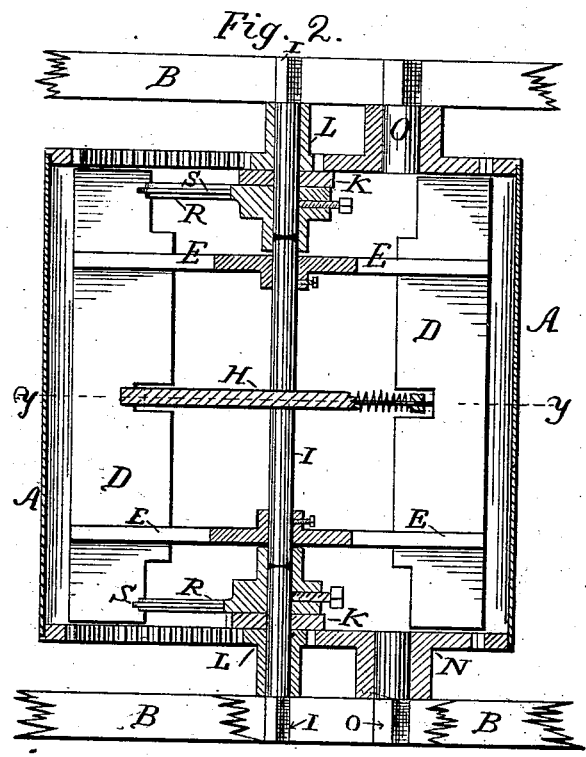
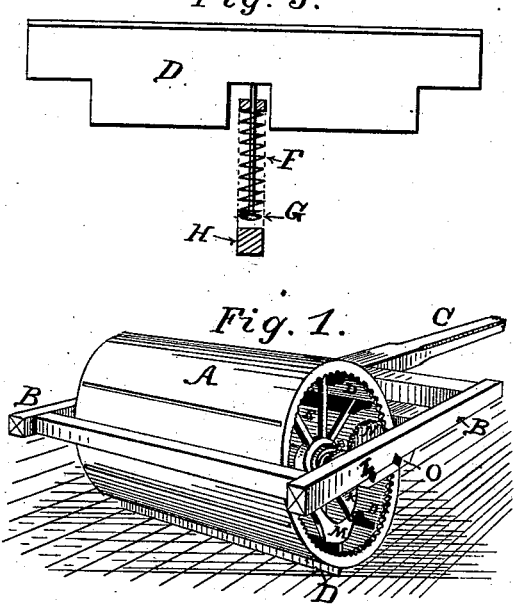
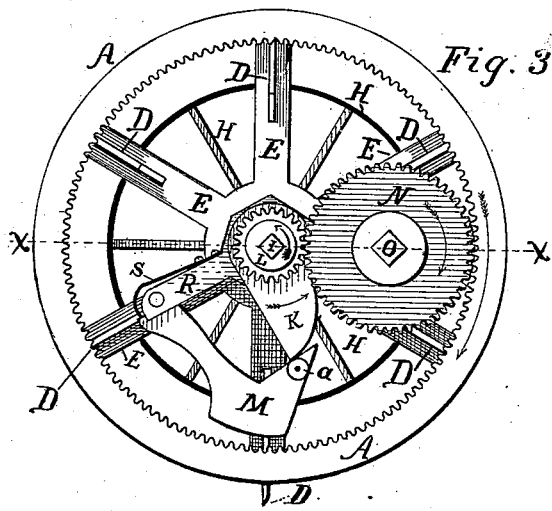
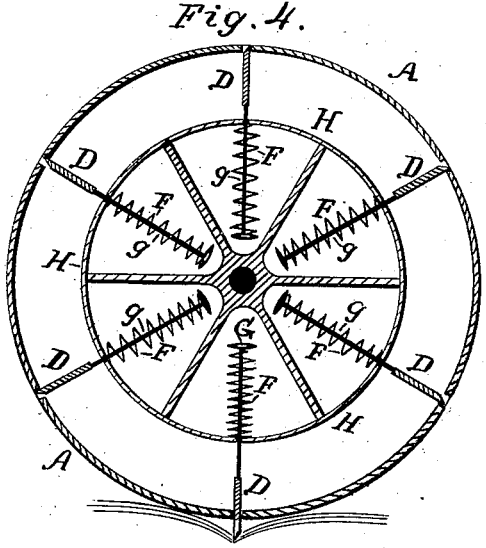
WITNESSES:
Thos Houghton
John C. Kenon
INVENTOR:
H. H. Spencer
BY
ATTORNEYS.
N. PETERS, PHOTO-LITHOGRAPHER, WASHINGTON, D. C.

UNITED STATES PATENT OFFICE.

HENRY H. SPENCER, OF MOUND CITY, ILLINOIS.

STALK AND WEED ROLLER AND CUTTER.

SPECIFICATION forming part of Letters Patent No. 240,473, dated April 19, 1881.

Application filed February 1, 1881. (Model.)

*To all whom it may concern:*

Be it known that I, HENRY H. SPENCER, of Mound City, in the county of Pulaski and State of Illinois, have invented a new and Improved Stalk and Weed Roller and Cutter; and I do hereby declare that the following is a full, clear, and exact description of the same.

My invention is an improvement in the class of machines for rolling down and cutting corn-stalks and weeds in which a series of knives or cutters are arranged to work in a radial direction in and out through lengthwise slots in a hollow cylinder or roller. Heretofore such reciprocating knives have been forced out gradually, being caused to project from the front side of the cylinder, and thereby strike the ground in advance of the slotted portion of the cylinder through which they work. The consequence is that they push down rather than strike upon the stalks and weeds, and if the ground be soft and the stalks and weeds damp and tough, the latter are usually doubled up and forced into the soil instead of being severed or cut up.

My machine is so constructed that the knives are at rest or have no reciprocating movement until, in the revolution of the cylinder, they arrive underneath the axle of the same, when they are caused, by cam-and-gear mechanism, to make a quick stroke, thus instantly severing the stalks or weeds upon which the whole weight of the machine is at that moment imposed. The knives are instantly retracted after such stroke by means of springs suitably arranged for the purpose.

I will proceed to describe my improved machine by reference to accompanying drawings, in which—

Figure 1 is a perspective view of the machine. Fig. 2 is mainly a horizontal section taken on line $x\ x$, Fig. 3. Fig. 3 is an end view of the machine without the frame. Fig. 4 is a vertical section on line $y\ y$, Fig. 2.

The hollow cylinder A is journaled, in the usual way, in a frame, B, having a rigid pole or tongue, C. The cylinder is provided with a series of lengthwise slots, through which the knives D work in and out. They are normally held retracted in slots in the radial spokes E of the cylinder by means of spiral springs F, which surround rods G, affixed to the knives and passing through the periphery of a wheel, H, which is loose on the rigid axle I, and hence rotates with the cylinder. The means for forcing out the knives D are the cams K, pinions L, presser-feet M, and gear N. The cams K and pinions L are mounted loosely on the axle I, while the gears N are mounted loosely on short journals O, rigidly attached to the frame B. The gear N meshes with the toothed internal gear of the cylinder A, so that the rotation of the latter communicates motion to the pinion and cam, causing them to rotate around the axle with comparative rapidity. The presser-foot M is a plate pivoted at one end to the outer extremity of a rigid arm, R, projecting downward and backward from the axle I. The presser-foot is held normally in horizontal position by means of a spring, S, affixed to said arm R, Fig. 3. As the cams K rotate their beveled ends strike upon a friction-roller, $a$, attached to the free or forward end of the presser-foot M, thus quickly depressing the latter and forcing it down upon the knife D, that chances to be immediately under it, so that such knife is, in turn, caused to suddenly project from the slot, Figs. 1, 3, and sever the stalks which the cylinder is passing over.

The operation of the machine is, in brief, this: As the roller or cylinder is drawn forward its rotation imparts rapid rotation to the pinions L and cams K, and the cams act on the presser-feet M, causing them to strike upon the knives D as each, in its turn, reaches the lower portion of the cylinder or is vertically beneath the axle I, so that such knife is forced out against the stalks or weeds upon which the entire weight of the machine is at the instant imposed. The springs F retract the knives D instantly the cut has been made, since the cams have then passed and the presser-feet been thrown up to their normal position, thus leaving the knives free. The rapidity of stroke of the knives and the fact that they act when the stalks are pressed firmly on the ground insure effective and thorough work.

It is of course desirable, and usually necessary, that the knives D shall not operate while the machine is being drawn to and from the field; hence I adapt the pinions L to be readily thrown out of gear. This is most conveniently done by sliding the pinions inward on the axle L to bring them out of engagement with gears N. In this instance the arms are secured by clamp-screws, Fig. 2, and hence the pinions may be shifted by first shifting said arms.

I am aware a vibrating knife or cutter has been combined with a crank-shaft, or equivalent device, geared with an internally-toothed drum, so as to act on the cutter and force it out through a slot in said drum, and hence I do not claim such or equivalent combination of parts.

What I claim is—

1. The combination of the presser-feet pivoted to rigid radial arms of the axle, and springs for supporting them, with the cams and pinions mounted loosely on the axle, the reciprocating knives, the cylinder having arms provided with slots, in which the knives work, and gearing for operating the cams, as shown and described.

2. The combination, with the slotted hollow cylinder and knives, arranged radially, as specified, of the wheel rotating with the cylinder, the rods or stems affixed to said knives and projecting inward through the periphery of the wheel, and the springs applied to such stems, as shown and described, for the purpose specified.

HENRY H. SPENCER.

Witnesses:
ROBT. WILSON,
W. E. JOHNSON.